US006710967B2

(12) United States Patent
Hennecken et al.

(10) Patent No.: US 6,710,967 B2
(45) Date of Patent: Mar. 23, 2004

(54) HIGH FREQUENCY AND LOW FREQUENCY SERVO PATTERN (75) Inventors: Mark Hennecken, Parker, CO (US);
Robert G. Brocko, Boulder, CO (US);
Steven G. Trabert, Boulder, CO (US);
Ronald D. Gillingham, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 308 days.

(21) Appl. No.: 10/034,763

(22) Filed: Dec. 28, 2001

(65) Prior Publication Data

US 2003/0123181 A1 Jul. 3, 2003

(51) Int. Cl.[7] .............................................. G11B 5/584
(52) U.S. Cl. ...................................... 360/77.12; 360/70
(58) Field of Search ......................... 360/77.13, 77.12, 360/75, 69, 70, 45, 48, 72.2, 78.02, 122, 126

(56) References Cited

U.S. PATENT DOCUMENTS

| | | | | |
|---|---|---|---|---|
| 5,383,064 A | * | 1/1995 | Harman ........................ 360/45 |
| 5,572,392 A | | 11/1996 | Aboaf et al. | |
| 5,652,015 A | | 7/1997 | Aboaf et al. | |
| 5,689,384 A | * | 11/1997 | Albrecht et al. ......... 360/77.12 |
| 5,923,272 A | | 7/1999 | Albrecht et al. | |
| 5,930,065 A | * | 7/1999 | Albrecht et al. ........... 360/72.2 |
| 6,021,013 A | | 2/2000 | Albrecht et al. | |
| 6,166,870 A | * | 12/2000 | Cates et al. ................... 360/48 |
| 6,191,917 B1 | * | 2/2001 | Dee et al. .................... 360/126 |
| 6,236,525 B1 | | 5/2001 | Cates et al. | |
| 6,320,719 B1 | * | 11/2001 | Albrecht et al. ......... 360/77.12 |
| 6,433,949 B1 | * | 8/2002 | Murphy et al. ............... 360/75 |
| 6,462,904 B1 | * | 10/2002 | Albrecht et al. ............ 360/122 |
| 6,522,490 B1 | * | 2/2003 | Cates et al. ................... 360/48 |
| 6,542,325 B1 | * | 4/2003 | Molstad et al. .......... 360/77.12 |
| 6,580,581 B1 | * | 6/2003 | Bui et al. ................. 360/78.02 |
| 6,614,607 B1 | * | 9/2003 | Rothermel et al. ........... 360/48 |

FOREIGN PATENT DOCUMENTS

EP            0 940 805 A2        9/1999

* cited by examiner

Primary Examiner—David Hudspeth
Assistant Examiner—Fred F. Tzeng
(74) Attorney, Agent, or Firm—Brooks Kushman P.C.

(57) ABSTRACT

Servo tracks combine low frequency transitions for fine transverse positioning with high frequency fields providing additional information. In one embodiment, each servo frame has a first field of recorded low frequency transitions, a second field of recorded low frequency transitions, and at least one high frequency field. The first low frequency field transitions are recorded on the tape such that a peak of each first field transitions varies in longitudinal position across the width of the servo frame. The second field of low frequency transitions are recorded on the tape such that a peak of each second field transition is not parallel with the peak of any first field transition. High frequency fields may provide one or more of timing information, longitudinal position information and gross transverse position information.

25 Claims, 10 Drawing Sheets

HIGH FREQUENCY AND LOW FREQUENCY SERVO PATTERN

BACKGROUND OF THE INVENTION

1. Field of the Invention

The present invention relates to servo tracks written on magnetic tape to assist tape access machines in locating and positioning tape access heads on the magnetic tape and to otherwise access the magnetic tape.

2. Background Art

Magnetic tape is commonly used to store voice and data information due to its reliability, cost efficiency, and ease of use. Magnetic tape may be made more useful and cost-effective by increasing the areal density of information stored on the magnetic tape. This has generally been accomplished by including more data tracks on a given width of tape. While allowing more data to be stored, the increase in density of data tracks requires a narrowing of the width of the data tracks, a narrowing of the spacing between data tracks, or both. As the data tracks are made narrower or are more closely spaced, positioning of the tape with respect to the tape head becomes more critical to reduce the possibility of errors introduced while reading or writing.

Tape heads generally include read elements for reading data from the magnetic tape and write elements for writing to the magnetic tape. Typically, read elements may be formed in a read module with one read element for each data track that is to be simultaneously read. Similarly, write elements are manufactured into a write module, with one write element for each data track to be simultaneously written. Thin film construction techniques are used to achieve the small geometries required to produce read elements and write elements capable of accessing densely packed data tracks. To permit read-after-write operation on tape moving in either direction over the tape head, a typical tape head may include a sandwich of one write module between two read modules.

In order to increase the accuracy of positioning the tape head relative to the tape, servo tracks or stripes may be used to provide one or more reference points. One or more servo tracks may be used depending upon the number of data tracks which are placed upon the tape, the number of tracks simultaneously accessed, and the like. Servo read elements in the read modules or write modules sense tracking patterns on the servo stripe and produce signals which are received by a control system. The control system positions the head based on the servo signals.

One type of servo pattern allowing the position of a servo read element across the width of a servo track uses two sets of low frequency transitions in each servo frame. The two sets of low frequency transitions are recorded at a relative angle to each other at a given transverse location across the servo track. Thus, a time difference between accessing transitions in the first set and accessing transitions in the second set provides an indication of the servo read element location across the width of the servo track.

A servo track may contain information in addition to fine transverse location. For example, a servo stripe number may be encoded in the servo track for coarse transverse location. A longitudinal value may be encoded in some or all servo frames to indicate position of the access head along the tape length. One method for encoding such additional information is to vary the spacing between one or more low frequency transitions in each set of transitions. For example, the second transition in each set may be moved closer to the first transition to indicate a binary one and may be spaced equally between the first and third transitions to indicate a binary zero.

There are several problems associated with varying the spacing between low frequency transitions in one or more servo frames. First, the rate of information transfer is low, with typically only one bit communicated per servo frame. Second, the technique is asymmetric, requiring complicated logic in the tape access system to correctly interpret transition spacings when reading the tape in either direction. Third, positional shifting of low frequency transitions causes peak shifting of waveforms received from the servo read element, thus changing the servo read waveforms. The change in waveform shape requires additional electronics for correct interpretation. Fourth, the low frequency pattern is typically written by a single current driver, and thus cannot contain any information that varies between the servo tracks, such as a servo stripe number.

What is needed is to provide additional information in servo tracks containing fine positioning low frequency transitions that does not require modifying the low frequency transitions to convey this information.

SUMMARY OF THE INVENTION

The present invention combines low frequency transitions for fine transverse positioning with high frequency fields providing additional information.

A servo pattern recorded longitudinally along a length of magnetic tape is provided. The servo pattern has a plurality of servo frames, each servo frame having a first field of recorded low frequency transitions, a second field of recorded low frequency transitions, and at least one high frequency field recorded on the tape. The first low frequency field transitions are recorded on the tape such that a peak of each first field transitions varies in longitudinal position across the width of the servo frame. The second field of low frequency transitions are recorded on the tape such that no peak of any second field transition is parallel with the peak of any first field transition. At least one high frequency field defines a timing pattern. The timing pattern may be used to provide a reference for generating a clock signal that varies with tape speed.

In an embodiment of the present invention, at least one high frequency field defines servo data. This servo data may encode longitudinal position along the length of the tape, transverse position across the width of the tape, tape identification, and the like. The high frequency field defining a timing pattern may be two high frequency fields, one on either side of the high frequency field defining servo data.

In another embodiment of the present invention, each servo frame is symmetric with regards to longitudinal movement along the tape.

In yet another embodiment of the present invention, at least a subset of the servo frames provides the same information when read in one tape direction as information provided when read in the opposite tape direction.

A magnetic tape is also provided. The tape has longitudinal data tracks for storing data. The tape also has a plurality of servo tracks written along a length of the tape. Each servo track includes a plurality of servo frames. Each servo frame has a first field of recorded low frequency transitions and a second field of recorded low frequency transitions. The first field transitions are recorded such that a peak of each first field transition varies in longitudinal position across a width of the servo frame. The second field transitions are recorded on the tape such that a peak of each second field transition is not parallel with a corresponding peak of any first field transition. A high frequency servo data field is recorded in at least a subset of the servo frames. The high frequency servo data field indicates transverse position across the width of the tape.

A method of positioning a tape access head across the width of a tape is also provided. Transitions in a first low frequency field recorded on at least one of a plurality of servo tracks are sensed. Transitions in a second low frequency field recorded on these same servo tracks not parallel to the first transitions are also sensed. Fine positioning across the tape width is determined based on a time difference between sensing transitions in the first low frequency field and sensing transitions in the second low frequency field. A high frequency field recorded on the servo tracks is further sensed. Gross positioning across the tape width is determined based on the sensed high frequency fields.

A method of determining the position of a tape access head across the width of a tape is also provided. Transitions in a first low frequency field are sensed. Transitions in a second low frequency field oriented in a different direction than the transitions in the first low frequency field are also sensed. A high frequency timing field recorded on at least one servo track is also sensed.

In an embodiment of the present invention, a tape travel parameter is determined based on the high frequency timing field. Positioning across the tape width is determined based on the tape travel parameter and on a time difference between sensing transitions in the first low frequency field and sensing transitions in the second low frequency field.

A tape deck for accessing data tape is also provided. The tape deck includes a tape access head with servo read elements. Each servo read element operates to read one of a plurality of servo tracks written along a length of the tape. A servo mechanism positions the tape access head across the width of the tape. Signal conditioning electronics receive a servo signal from the servo read elements. Position determination logic receives the conditioned servo signal. The position determination logic determines the transverse position of at least one servo read element across the width of the servo track based on two sets of low frequency transitions recorded on the servo track. Timing extraction logic receiving conditioned servo signals extracts a clock signal from high frequency transitions recorded on the servo track as the tape moves past the tape head.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
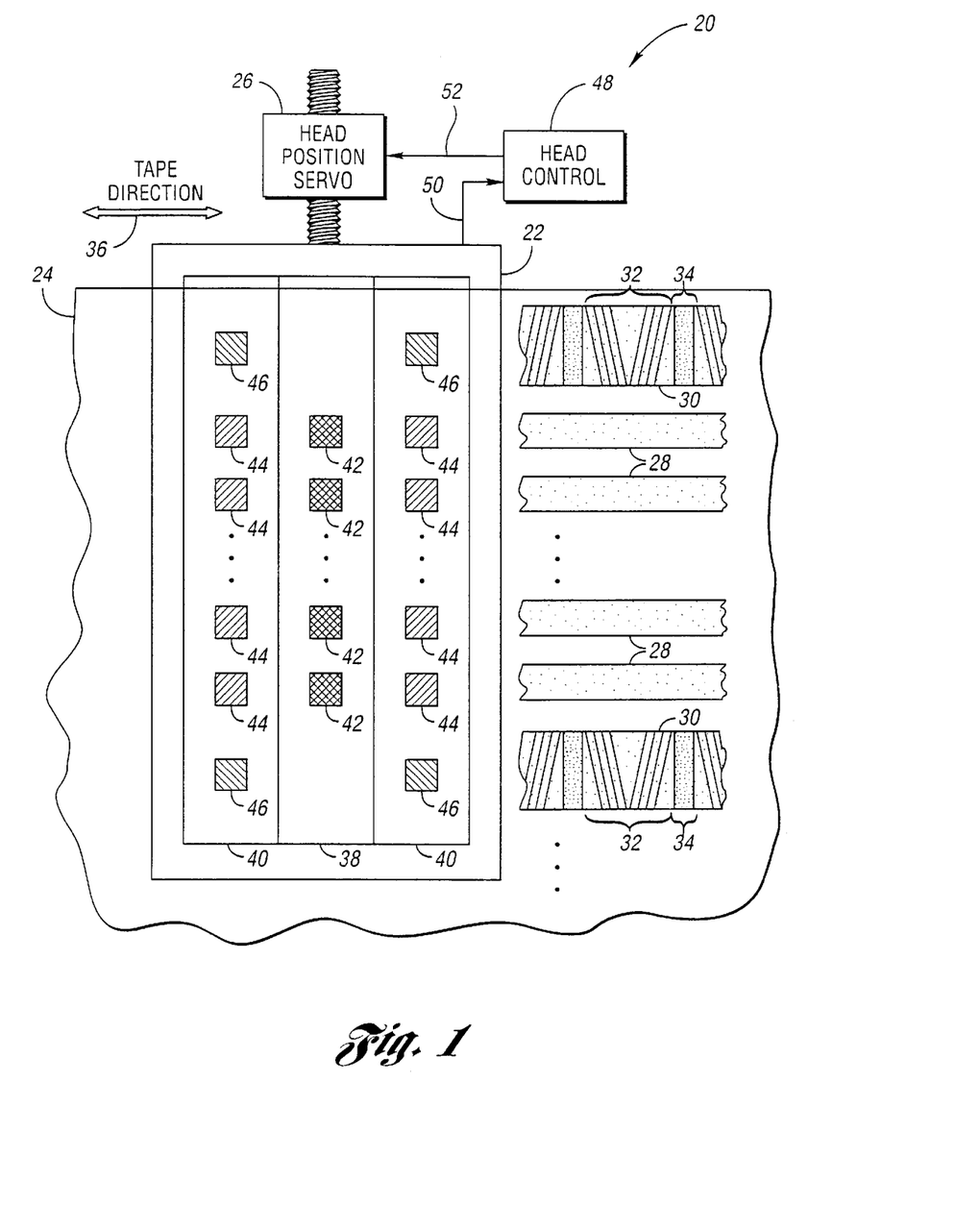
FIG. 1 is a schematic drawing illustrating magnetic tape and a tape access head according to an embodiment of the present invention.

Referring to FIG. 1, a schematic drawing illustrating magnetic tape and a tape access head according to an embodiment of the present invention is shown. A tape deck, shown generally by 20, includes tape head 22 for accessing magnetic tape 24. Tape head 22 is positioned transversely across the width of tape 24 by head position servo 26.

Tape 24 includes a plurality of data tracks 28 spaced across the width of tape 24. Tape 24 also includes at least one servo track 30 written along the length of tape 24. Each servo track 30 may include periodically spaced features such as low frequency transitions 32 and high frequency transitions 34. Tape 24 travels across tape head 22 in either tape direction 36. Only a portion of each data track 28 and servo stripe 30 are shown and only an outline for a portion of tape 24 is provided to permit the details of tape head 22 to be seen.

Tape head 22 in FIG. 1 includes one write module 38 between two read modules 40 to form a read-write-read head. Write module 38 includes a plurality of write elements 42. Each write element 42 is a magnetic circuit which induces field patterns in data track 28 as tape 24 moves past a gap in write element 42. Read module 40 is manufactured to have a plurality of read elements 44. Read module 40 also includes at least one servo read element 46. Read elements 44 and servo read elements 46 sense field patterns written onto data tracks 28 and servo tracks 30, respectively, by detecting changes in inductance or magneto resistance induced by the field patterns. It will be recognized by one of ordinary skill in the art that the present invention does not depend on the design and construction of write elements 42, read elements 44, or servo read elements 46. Further, the present invention applies to any tape head 22 with at least one write element 42 and an associated read element 44 and not solely to the read-write-read head described.

At least one servo read element 46 is positioned to read low frequency transitions 32 and high frequency transitions 34 on servo track 30. Head control 48 receives servo read signals 50 from each servo read element 46. Head control 48 detects low frequency transitions 32 and determines the fine offset of tape 24 relative to tape head 22 in the direction normal to tape direction 36. If head control 48 detects that servo track 30 is not appropriately positioned relative to servo read element 46, head control 48 generates positioning signal 52 causing head position servo 26 to move tape head 22 relative to tape 24 until servo track 30 is appropriately positioned relative to servo read element 46. This positions data track 28 across write element 42 and read element 44 operative to access data track 28.

High frequency transitions 34 recorded on data track 30 may be used by head control 48 for a variety of purposes. First, head control 48 may extract timing information from servo read signals 50 generated by high frequency transitions 34. This timing information may be used to indicate the speed tape 24 is traveling past tape head 22. This timing information may also be used to synchronize or signal tape access operations. Second, head control 48 may extract longitudinal position information from servo read signals 50 generated by high frequency transitions 34. This longitudinal information indicates the location of servo read element 46 along the length of tape 24. Third, head control 48 may extract gross transverse positional information from servo read signals 50 generated by high frequency transitions 34. This information indicates which servo track 30 across the width of tape 24 is being accessed by servo read element 46.

Head position servo 26 provides a means for positioning tape head 22 across the width of tape 24. Head position servo 26 may include an electric actuator, a hydraulic actuator, a pneumatic actuator, a magnetic actuator, or the like. Force may be transferred through a variety of transmission systems including gear trains, screws, levers, cabling, belts, and the like. In a preferred embodiment, a voice coil motor is used to position tape head 22. It is understood by one of ordinary skill in the art that any means to position tape head 22 relative to tape 24 falls within the spirit and scope of the present invention.

Figure 2:
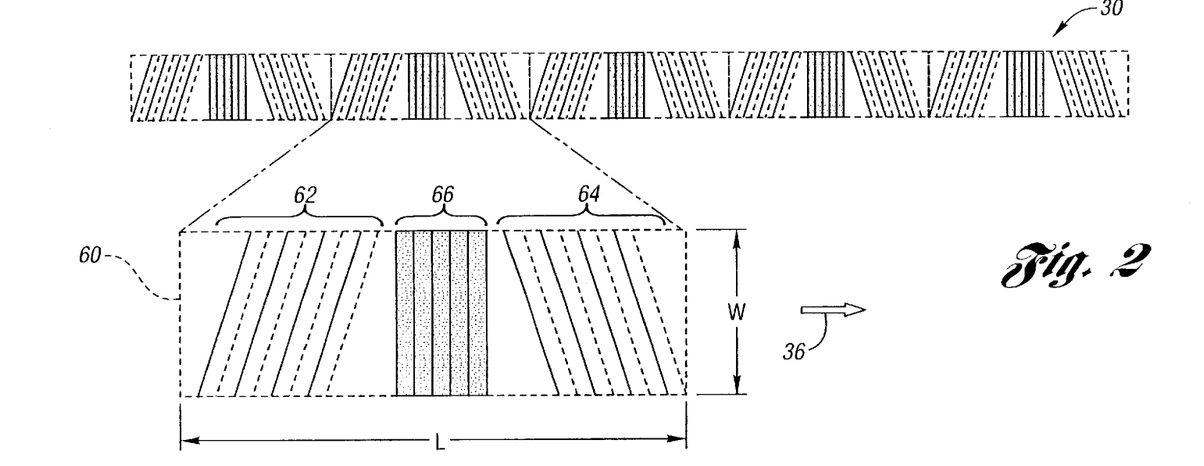
FIG. 2 is a schematic drawing illustrating a servo track according to an embodiment of the present invention.

Referring now to FIG. 2, a schematic drawing illustrating a servo track according to an embodiment of the present invention is shown. Servo track 30 defines a servo pattern recorded longitudinally along the length of magnetic tape 24. The servo pattern includes a plurality of servo frames 60, one of which has been expanded in FIG. 2. Servo frame 60 includes first field of recorded low frequency transitions 62. First field 62 has transitions recorded on tape 24 such that the peak of each transition varies longitudinally across the width of servo frame 60. In other words, each transition 62 is slanted relative to tape direction 36. Servo frame 60 also includes second field of recorded low frequency transitions 64. Transitions in second field 64 are recorded on tape 24 such that the peak of each second field transition is not parallel with the peak of any transition in first field 62. Servo frame 60 further includes high frequency field 66 containing high frequency transitions. As will be recognized by one of ordinary skill in the art, the terms high frequency and low frequency are relative. The actual frequency of signals received by reading high frequency transitions and low frequency transitions will depend upon the speed at which tape 24 moves past tape access head 22. A difference in the ratio of high frequency to low frequency is not fixed and may vary according to the application.

In the embodiment shown in FIG. 2, servo frame 60 has a width, indicated by W, of 150 µm. Servo frame 60 has a length, indicated by L, of 100 µm. Each field of low frequency transitions 62, 64 extends for a length of 34.418 µm. High frequency field 66 extends for a length of 23.665 µm. A spacing of 2.500 µm is used between each field 62, 64, 66. Spacing between transitions in low frequency fields 62, 64 is 2.0 µm. Spacing between transitions in high frequency field 66 is 0.25 µm. As will be recognized by one of ordinary skill in the art, these values, and other specific dimensions, vary according to the application.

In the embodiment shown, each field of low frequency transitions 62, 64 includes eight transitions. Each transition maximum value is represented by a solid line and each transition minimum value is represented by a dashed line. Transitions in each field 62, 64 are tilted at an angle relative to the normal of tape direction 36 of 7° with transitions in first field 62 tilted the opposite way as transitions in second field 64. As will be recognized by one of ordinary skill in the art, many variations for transitions in fields 62, 64 are possible. For example, one set of transitions 62, 64 may be normal to tape direction 36. Also, transitions with one or more breaks may be used. For example, each transition in fields 62, 64 may be shaped like a "V" or chevron, as is known in the art.

Figure 3:
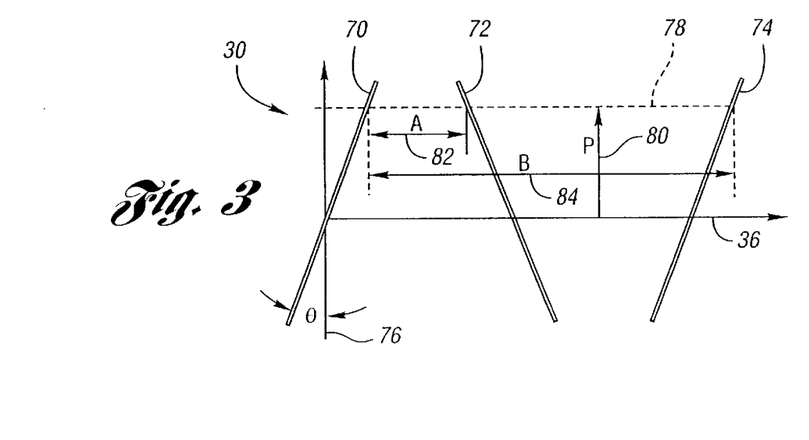
FIG. 3 is a schematic drawing illustrating fine transverse position determination according to an embodiment of the present invention.

Referring now to FIG. 3, a schematic diagram illustrating fine transverse position determination according to an embodiment of the present invention is shown. A section of servo track 30 includes first field transition peak 70 from a first servo frame 60, second field transition 72 from the same servo frame 60 corresponding in transition order with first field transition 70, and first field transition 74 in the following servo frame 60 in the same position as first field transition 70. First field transitions 70, 74 are at an angle of negative θ with regards to transverse axis 76 normal to tape direction 36. Second field transition 72 is at an angle of positive θ relative to transverse axis 76.

Servo read element 46 travels along servo track 30 at a path indicated by 78. This path is located a distance P, indicated by 80, from a centered path intersecting the middles of transitions 70, 72, 74. Determining distance 80 will locate servo read element 46 across the width of servo track 30.

As it travels along path 78, servo read element 30 intersects second field transition 72 a distance A, shown by 82, after crossing first field transition 70. Servo read element 46 will cross first field transition 74 in following servo frame 60 a distance B, shown by 84, after crossing the corresponding first field transition 70. Note that B is the length of servo frame 60. With this information, the fine transverse position distance P may be expressed by the following equation:

$$P = \frac{\frac{1}{2}B - A}{2\tan(\theta)}$$

The distances A and B need not be actually known. Instead, the time between crossing first field transition 70 and second field transition 72, a, and time between crossing first field transition 70 and first field transition 74 in following frame 66, b, may used. This results in the following equation:

$$P = \frac{B}{2\tan(\theta)} \left[ \frac{1}{2} - \frac{av}{bv} \right]$$

The velocity, v, cancels out. The distance B is independent of P and is controlled by the servo writer. Thus, like the angle θ, B is known a priori.

Figure 4:
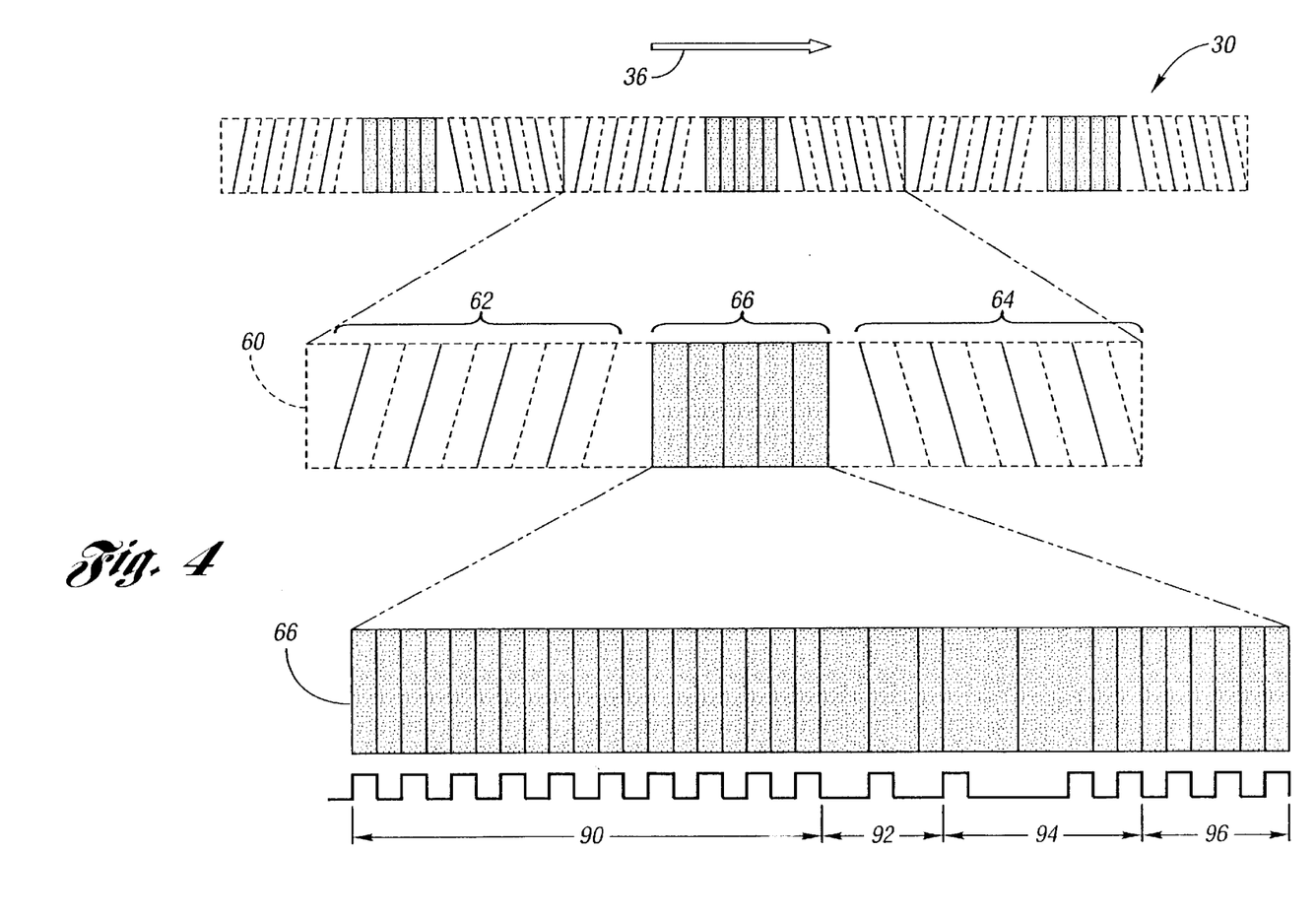
FIG. 4 is a schematic diagram illustrating servo data encoded on a servo track according to an embodiment of the present invention.

Referring now to FIG. 4, a schematic diagram illustrating servo data encoded on a servo track according to an embodiment of the present invention is shown. Servo frame 60 includes high frequency field 66 further divided into subfields. Preamble field 90 contains a sequence of high frequency transitions which can be used for a variety of purposes including timing, clock synchronization, velocity determination, and the like. Data synchronization field 92 contains a pattern, such as binary 010, to indicate the start of servo data. Data synchronization field 92 may also indicate the type of servo data to follow. Servo data field 94 contains servo data. In the examples shown, 10 bits of servo data are encoded in each servo frame 60. Servo data may be used for a variety of purposes such as indicating longitudinal position along the length of tape 24, number of servo track 30, location of servo track 30 across the width of tape 24, tape identification number, and the like. Trailing synchronization reference field 96 may be included to perform the same function as preamble field 90 when tape 24 is moved in opposite tape direction 36.

Low frequency transition fields 62, 64 are symmetric with regards to either tape direction 36. Thus, fine transverse positioning information is read from tape 24 the same in either tape direction 36. Likewise, high frequency field 66 may also be made symmetric with regards to either tape direction 36.

Figure 5:
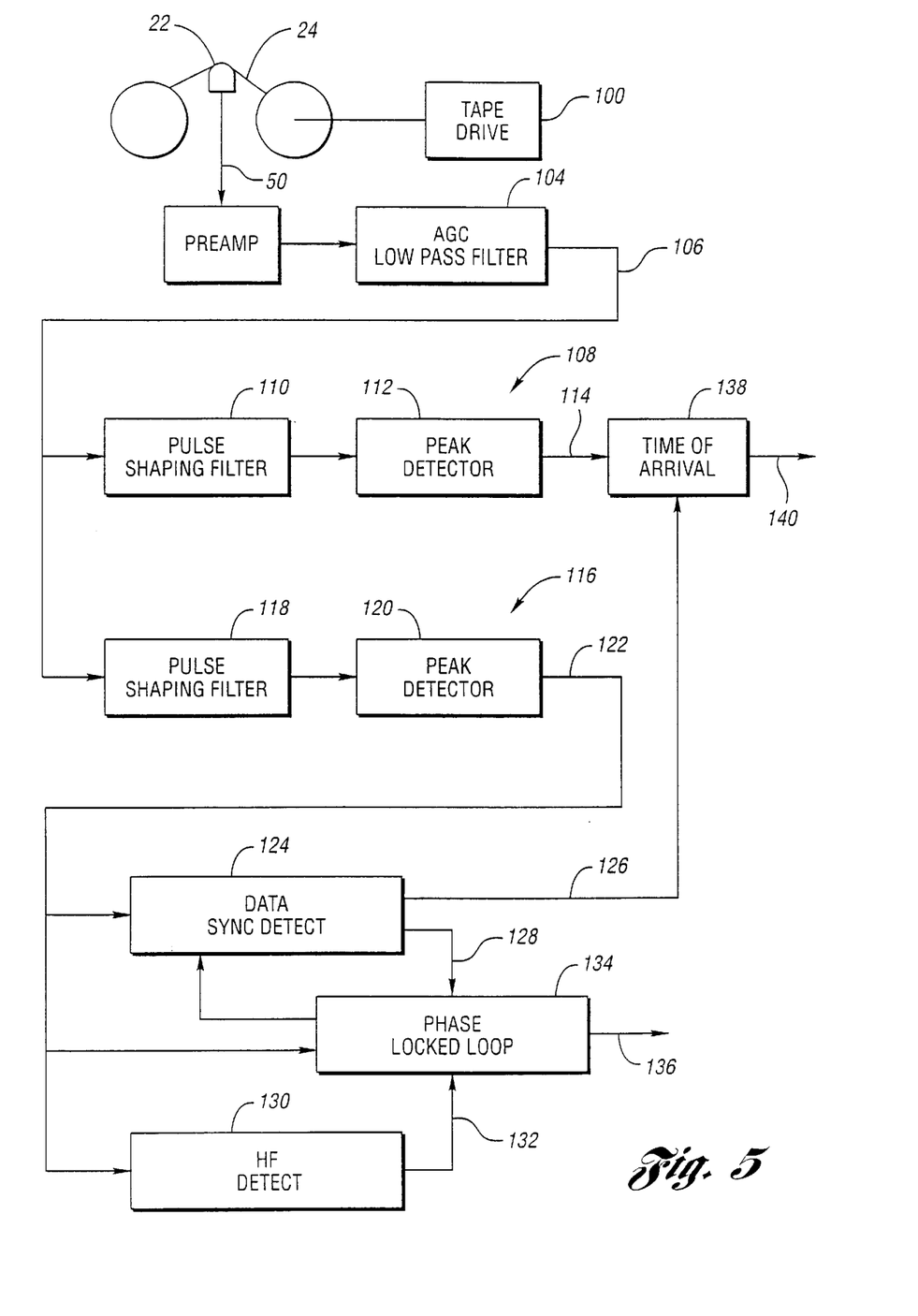
FIG. 5 is a block diagram illustrating a tape access system according to an embodiment of the present invention.

Referring now to FIG. 5, a block diagram illustrating a tape access system according to an embodiment of the present invention is shown. Tape system 20 includes tape drive 100 operative to move tape 24 past tape head 22. One or more servo read elements on head 22 detect one or more servo tracks 30 as tape 24 moves past head 22, generating servo read signals 50. Preamp 102 amplifies servo read signals 50. Automatic gain control (AGC) and low pass filter 104 remove noise, compensate for signal fluctuation, and otherwise condition servo read signals 50 to produce conditioned servo signals 106.

A low frequency section, shown generally by 108, includes pulse shaping filter 110 receiving conditioned servo signals 106. Pulse shaping filter 110 outputs pulses corresponding to signals received from low frequency transitions in fields 62, 64. Peak detector 112 receives pulse shaped low frequency transition signals and generates low frequency transition indication signal 114 containing an assertion corresponding to each low frequency transition in fields 62, 64.

A high frequency section, shown generally by 116, includes pulse shaping filter 118 receiving conditioned servo signals 106 and generating shaped pulses corresponding to high frequency transitions in high frequency field 66. Peak detector 120 accepts shaped high frequency pulses and generates high frequency transition indication signal 122 containing assertions corresponding to each high frequency transition in high frequency field 66.

Data sync detect 124 receives high frequency transition indication signal 122 and detects field 92 to produce tape travel parameter signal 126 and signal 128. Tape travel parameter signal 126 includes one or more tape travel parameter such as, for example, tape velocity. High frequency detect 130 accepts high frequency transition indication signal 122 and detects the high frequency region for initial acquisition until data sync detect 124 takes over to generate signal 132. Phase lock loop 134 accepts high frequency transition indication signal 122, signal 128 and signal 132, and generates timing reference signal 136 which is used to generate a write and read clock signal that is directly proportional to tape speed. Timing reference signal 136 is more fully described in U.S. patent application attorney reference number 2001-024-TAP, which is incorporated herein by reference in its entirety.

Time of arrival logic 138 accepts low frequency transition indication signal 114 and tape travel parameter signal 126 and calculates position signal 140 indicative of the transverse position of sensor read element 46 across the width of servo track 30. Position signal 140 may be used by head position servo 26 to change the relative location of head 22 across the width of tape 24.

Figure 6:
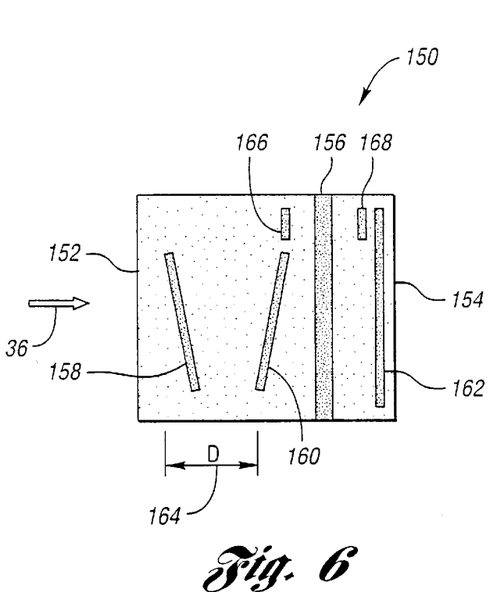
FIG. 6 is a schematic diagram illustrating a servo track write head according to an embodiment of the present invention.

Referring now to FIG. 6, a schematic diagram illustrating a servo track write head according to an embodiment of the present invention is shown. A servo track write head, shown generally by 150, includes first module 152 and second module 154 attached to either side of magnetic shield 156.

Servo track write head 150 includes first write gap 158 shown having a gap section at a first angle relative to tape direction 36. Second write gap 160 is shown with one gap section at a second angle relative to tape direction 36 not equal to the first angle. First write gap 158 and second write gap 160 write low frequency transitions in each servo frame 60. Third write gap 162 writes high frequency transitions in servo frame 60. Third write gap 162 is shown perpendicular to tape direction 36, though other orientations and configurations for third write gap 162 are possible within the scope of the present invention.

First write gap 158 and second write gap 160 may each be part of separate magnetic circuits. Preferably, first write gap 158 and second write gap 160 are part of the same magnetic circuit permitting each low frequency transition in first field 62 to be written concurrently with a corresponding low frequency transition in second field 64. Thus, the spacing between first write gap 158 and second write gap 160 must be properly set. The low frequency write gap distance, D, shown by 164, for writing low frequency fields 62, 64 as described with regards to FIG. 2 is 63.034 μm.

First module 152 may include fourth write gap 166 for writing a timing signal onto tape 24. Fourth write gap 166 may be separate from write gaps 158, 160 or may extend from either write gap 158, 160. Read element 168, located on second module 154, reads this timing signal for determining when to write high frequency transitions with third write gap 162. In the embodiment shown, the read gap for read element 168 and third write gap 162 share a common shield as is known in the art.

Figure 7:
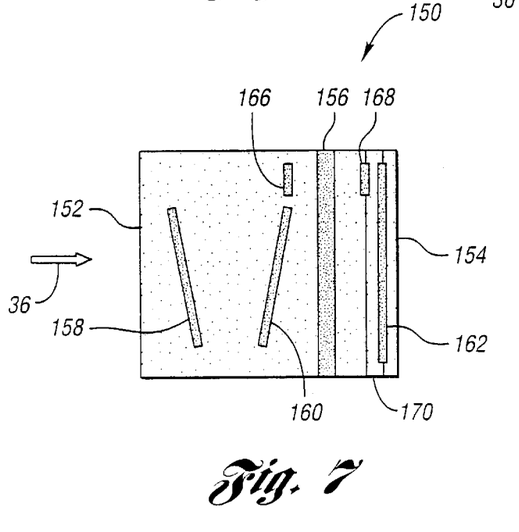
FIG. 7 is a schematic diagram illustrating a servo track write head according to an embodiment of the present invention.

Referring now to FIG. 7, a schematic diagram illustrating a servo track write head according to an embodiment of the present invention is shown. In this embodiment, the read gap for read element 168 and third write gap 162 are separated by shield 170.

Figure 8:
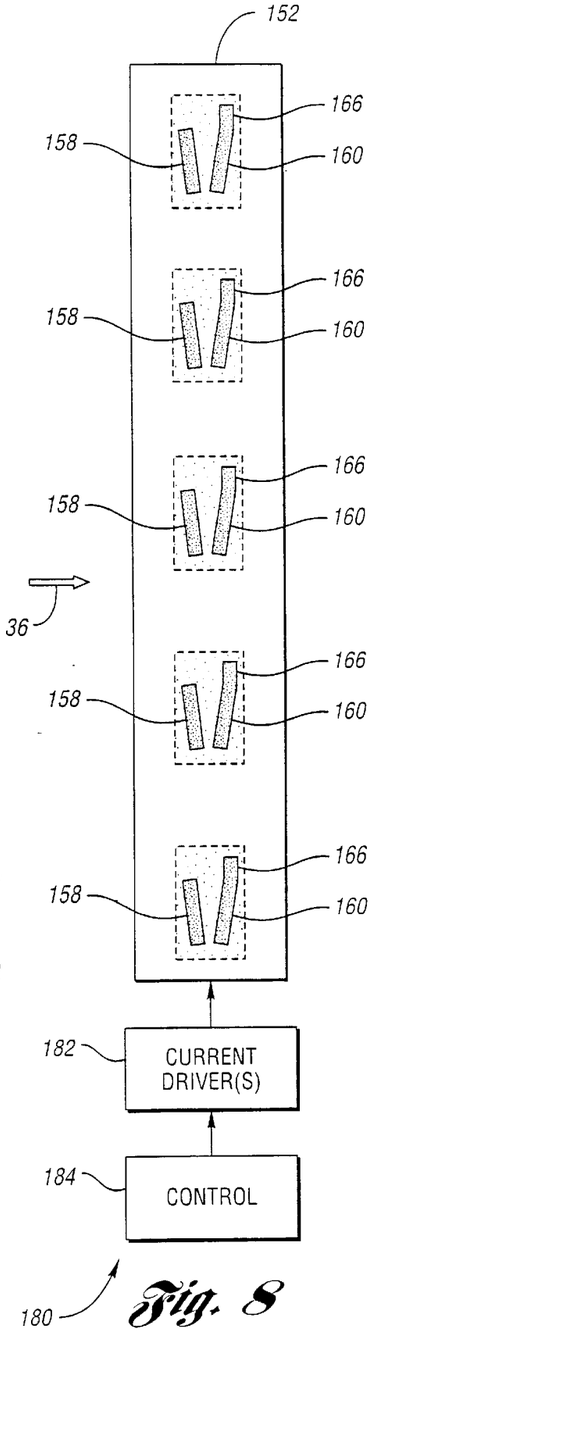
FIG. 8 is a block diagram illustrating low frequency transition writing according to an embodiment of the present invention.

Referring now to FIG. 8, a block diagram illustrating low frequency transition writing according to an embodiment of the present invention is shown. A servo track write system, a portion of which is indicated by 180, includes first module 152 for simultaneously writing five servo tracks 30. Thus, there are five first write gaps 158, five second write gaps 160, and five fourth write gaps 166. As will be recognized by one of ordinary skill in the art, any number of write gaps 158, 160, 166 may be used. If first write gaps 158 and second write gaps 160 are to operate concurrently for writing first low frequency fields 62 and second low frequency fields 64, all first write gaps 158 and second write gaps 160 may be driven by a single current driver 182. If fourth write gaps 166 are writing low frequency timing signals, fourth write gaps 166 may also be driven by the single current driver 182. If fourth write gaps 166 are writing high frequency timing signals, however, magnetic circuits including fourth write gaps 166 may be separately wired and may have a separate current driver 182. Control logic 184 controls current drivers 182. Control 184 may be implemented with one or more counters providing timing for triggering current drivers 182.

Figure 9:
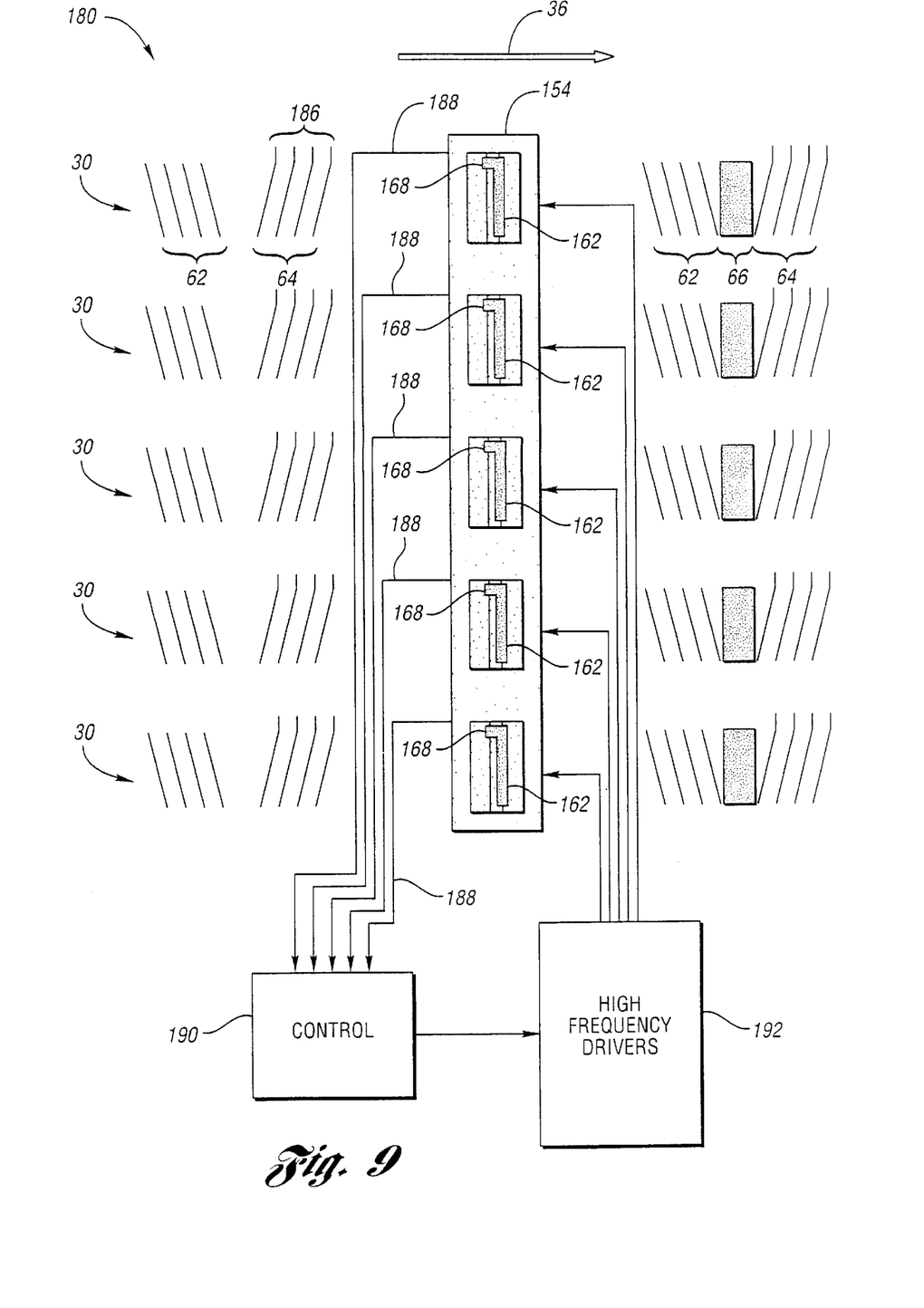
FIG. 9 is a block diagram illustrating high frequency transition writing according to an embodiment of the present invention.

Referring now to FIG. 9, a block diagram illustrating high frequency transition writing according to an embodiment of the present invention is shown. Servo track write system 180 includes second module 154 for simultaneously writing high frequency fields 66 into five servo tracks 30. Thus, second module 154 has five copies of third write gap 162 and servo read elements 168. Each servo read element 168 detects timing patterns 186 written by fourth write gap 166 and generates timing read signal 188. Control logic 190 receives timing read signals 188 and generates control signals for high frequency drivers 192. High frequency drivers 192 provide write signals to each fourth write gap 162 for writing each high frequency field 66. If high frequency field 66 includes servo data indicating servo track number or other gross transverse positioning information, each third write gap 162 must have a separate high frequency driver 192 since at least a portion of the high frequency signal written will be different amongst third write gaps 162.

Figure 10:
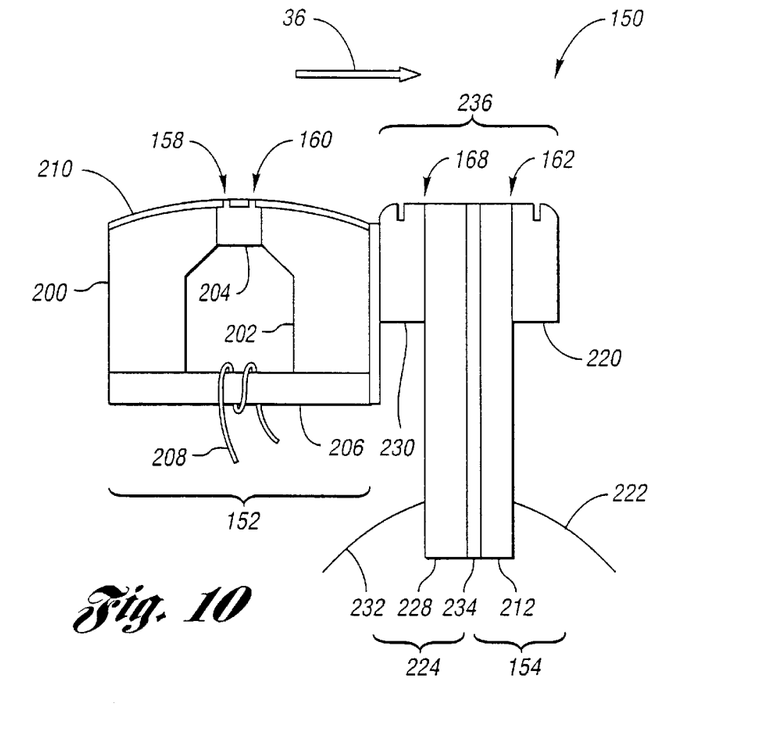
FIG. 10 is a side view drawing illustrating a servo track write head according to an embodiment of the present invention.
Figure 11:
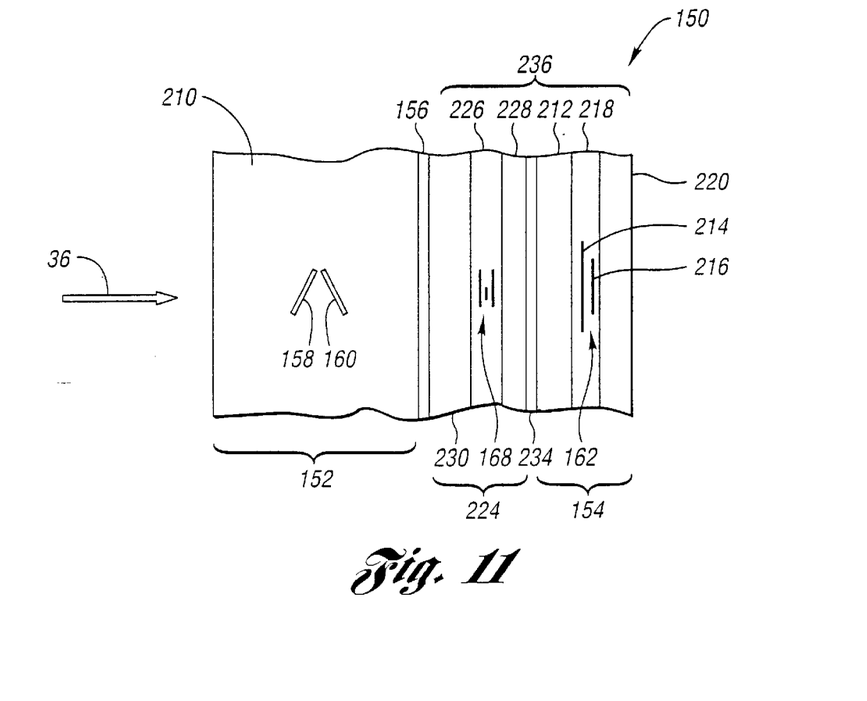
FIG. 11 is a top view drawing of the servo track write head of FIG. 10.

Referring now to FIG. 10, a side view drawing, and to FIG. 11, a top view drawing, a servo track write head according to an embodiment of the present invention is shown. FIGS. 10 and 11 are conceptualized drawings and are not drawn to scale. A servo track write head, shown generally by 150, includes first module 152 defining first write gap 158 and second write gap 160. First module 152 includes first ferrite block 200 and second ferrite block 202 bonded to glass spacer 204. First ferrite block 200 and second ferrite block 202 are bonded to third ferrite block 206, around which is wound at least one turn of wire 208. Gap structure 210 overlays ferrite block 200, 202 and glass spacer 204 and defines first gap 158 and second gap 160 over glass spacer 204. Gap structure 210 may be constructed by depositing a conducting seed layer such as, for example, NiFe. A gap forming layer such as nickel-iron ($Ni_{45}Fe_{55}$) is plated on the seed layer. First gap 158 and second gap 160 are formed using standard lithographic techniques. A wear-resistant coating may then be deposited to complete gap structure 210. The widths of first gap 158 and second gap 160 depend upon a variety of factors, including the write signal applied to wire 208, materials and configuration for first module 152, number of turns of wire 208, construction of tape 24, and the like. To write low frequency fields 62, 64 described in FIG. 2, an effective gap width of 2 microns is preferred for first gap 158 and second gap 160. This effective gap width may be achieved by creating an actual gap width of 3.0–3.5 microns prior to depositing a protective top layer.

Second module 154 defines third write gap 162. Second module 154 may be formed on substrate 212 which may be made of, for example, AlTiC. Bottom pole 214 and top pole 216 forming second gap 162 are formed in insulator 218 on substrate 212. Third write gap 162 may thus be formed by depositing an underlayer of alumina on substrate 212. Bottom pole 214, constructed of NiFe, is deposited on the alumina underlayer. An alumina gap layer is deposited on bottom pole 214. Top pole 216, constructed of NiFe, is formed on the alumina gap layer. An alumina overcoat layer is deposited over top pole 216. Bottom pole 214 and top pole 216 form an electromagnet driven by current supplied to second module 154 by flex attach cable 222.

Servo track write head 150 includes third module 224 with read element 168. Read element 168 is formed in insulative layer 226 on substrate 228 and is capped by closure 230. Read element 168 is a thin film shielded SAL sensor with permanent magnet and periodic structure stabilization. Read element 168, as shown in FIG. 11, is positioned to read low frequency transitions written by first write gap 158 and second write gap 160. Signals generated by servo read element 168 are delivered off third module 224 by flex attach cable 232. Third module 224 and second module 154 are separated by magnetic shield 234. Second module 154, third module 224, and shield 234 form thin film read-write head 236.

In the embodiment shown in FIG. 11, servo read element 168 is positioned to read low frequency transitions written by first write gap 158 and second write gap 160. Thus, signals generated by servo read element 168 may be used to verify low frequency fields 62, 64. Signals generated by servo read element 168 may also be used to control the timing of high frequency field 66 written by third write gap 162. A single set of first write gap 158, second write gap 160, third write gap 162, and servo read element 168 are shown in FIG. 11. It will be recognized by one of ordinary skill in the art that servo track write head 150 may include a plurality of such sets to simultaneously write servo tracks 30 onto tape 24.

In the embodiment shown in FIG. 10, one coil of wire 207 in C-core ferrite block 200 imparts magnetic flux in response to a 4 amp current. Magnetic shield 156 constructed of, for example, 2.5 $\mu$m thick brass, shields read element 168 from this flux.

Figure 12:
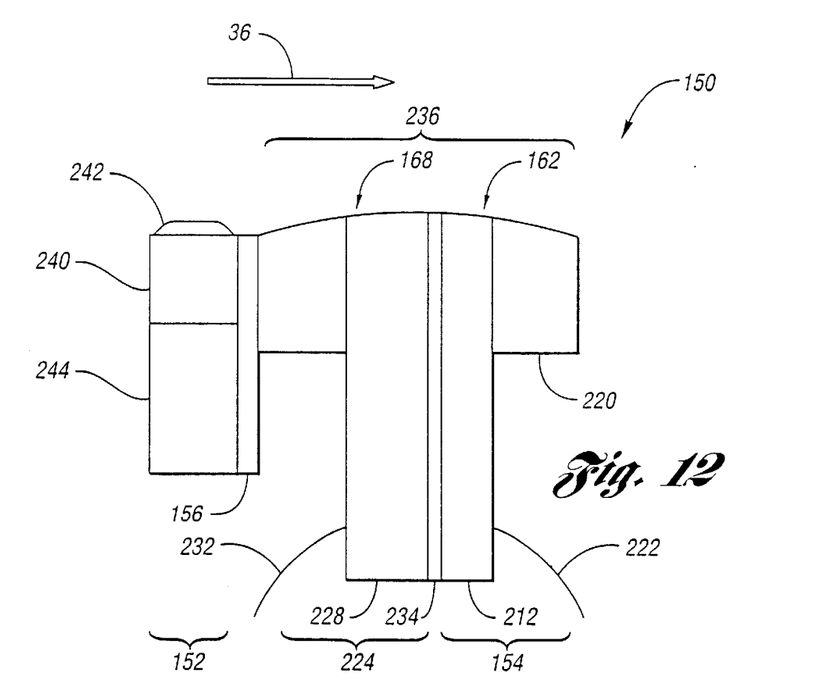
FIG. 12 is a side view drawing illustrating a servo track write head according to an embodiment of the present invention.
Figure 13:
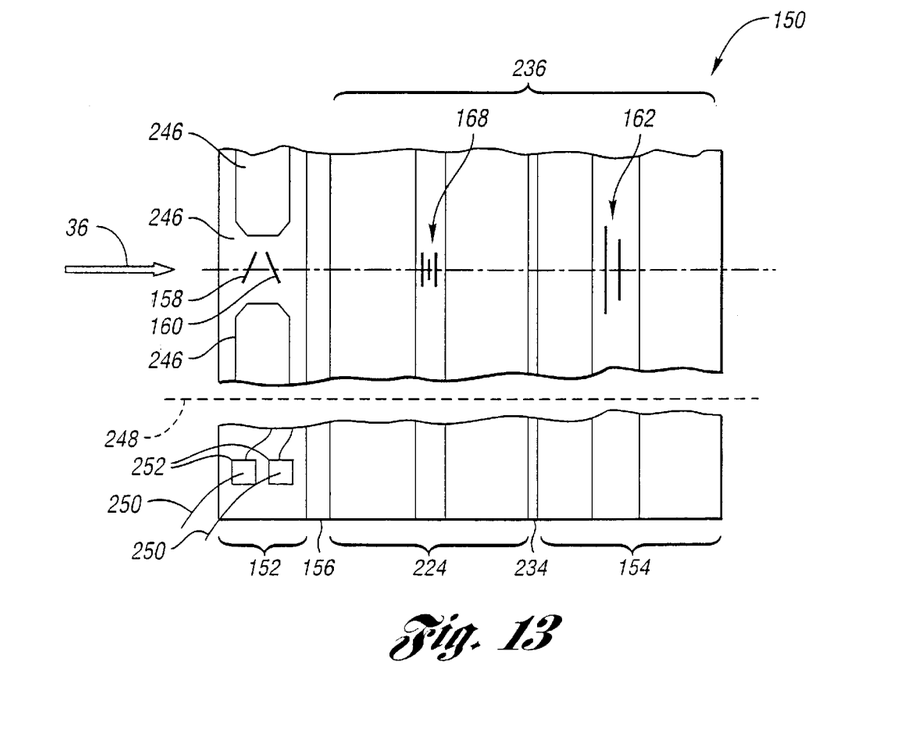
FIG. 13 is a top view drawing of the servo track write head of FIG. 12.

Referring now to FIG. 12, a side view drawing, and to FIG. 13, a top view drawing, a servo track write head according to an embodiment of the present invention is shown. FIGS. 12 and 13 are conceptualized drawings and are not drawn to scale. Read-write head 236 may be constructed in a manner as described with regards to FIGS. 10 and 11 above.

First module 152 is constructed with a thin film low frequency write head defining first gap 158 and second gap 160. Substrate 240 supports a bottom pole and top pole structure 242 rising above substrate 240. Substrate 240 may be attached to support 244 for additional strength. Top pole structure 242 is patterned with first write gap 158 and second write gap 160. The top surface of top pole structure 242 forms the head-tape interface wear surface and may be constructed of CZT or NiFe/FeN. Closure 246 provides an air bearing surface for tape 24 traveling over servo track write head 150. Additional details for constructing thin film first module 152 may be found in U.S. Pat. Nos. 5,572,392, titled "Arbitrary Pattern Write Head Assembly For Writing Timing-Based Servo Patterns On Magnetic Storage Media," and 5,652,015, titled "Process For Fabricating An Arbitrary Pattern Write Head," both of which are incorporated by reference herein.

Servo track write head 150 extends beyond tape edge 248 to provide for lead wires 250 attached to bonding pads 252. Lead wires 250 carry current signals for writing low frequency transitions 32 on tape 24 as tape 24 passes first write gap 158 and second write gap 160.

Figure 14:
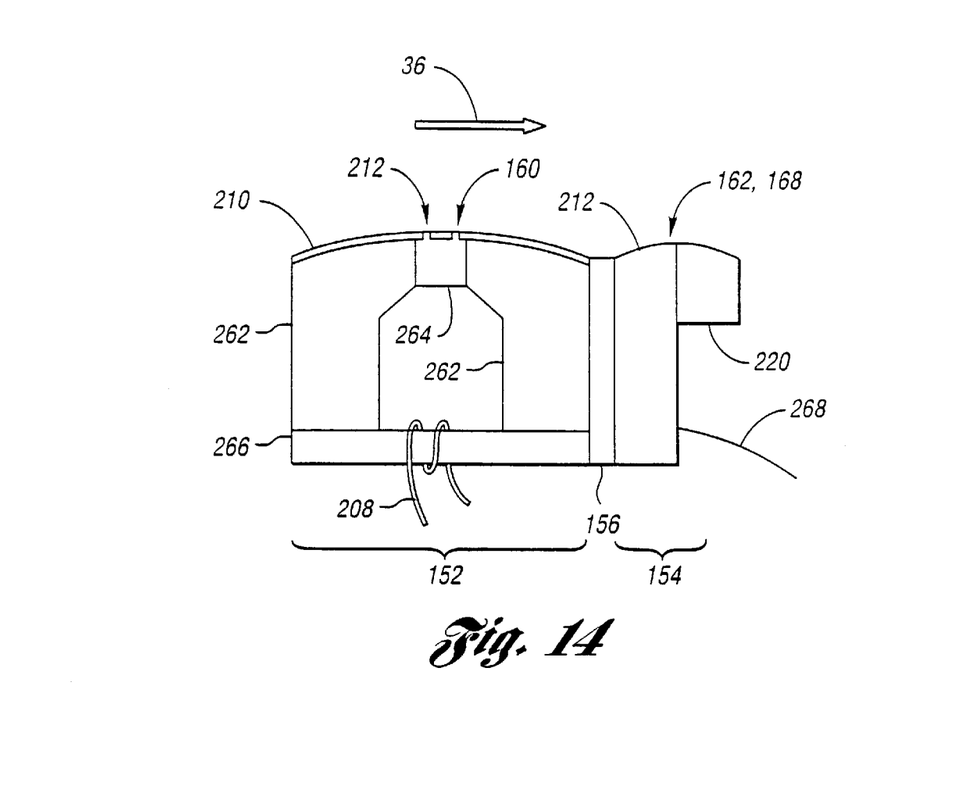
FIG. 14 is a side view drawing illustrating a servo track write head according to an embodiment of the present invention.
Figure 15:
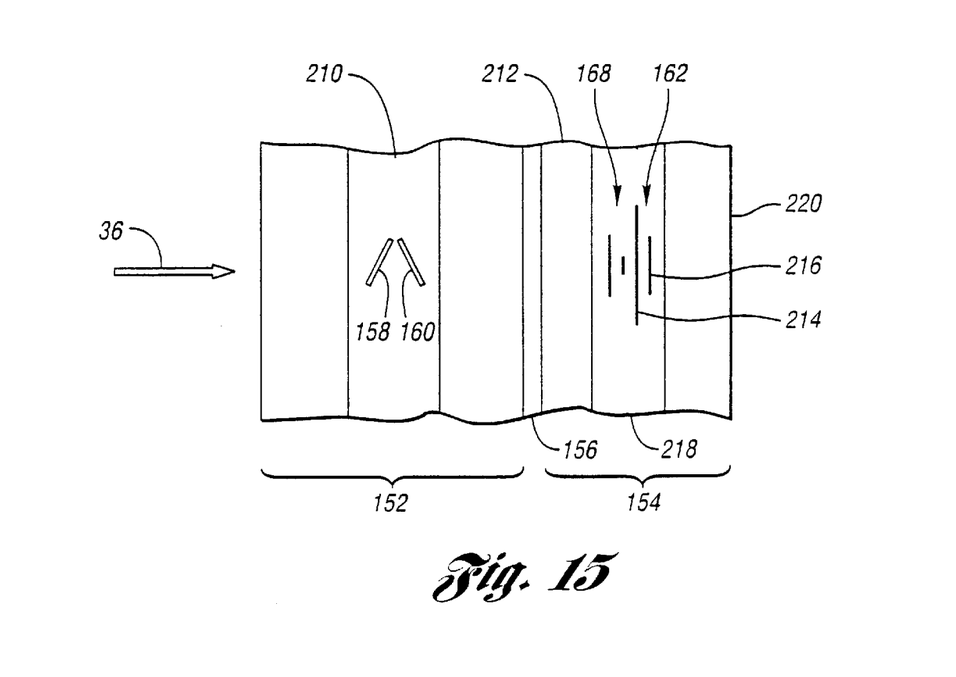
FIG. 15 is a top view drawing of the servo track write head of FIG. 14.

Referring now to FIG. 14, a side view drawing, and FIG. 15, a top view drawing, a servo track write head according to an embodiment of the present invention is shown. FIGS. 14 and 15 are conceptualized drawings and are not drawn to scale. First module 152 is shown with an alternate C-core construction. Wire 208 is coiled around bottom ferrite block 260. Side ferrite blocks 262, 264 extend from bottom ferrite block 260. Side ferrite block 262 is separated from side ferrite block 264 opposite coiled wire 208 by insulator block 266. Gap structure 210 is formed over the top of side ferrite blocks 262, 264 and insulator block 266. First write gap 158 and second write gap 160 are formed in gap structure 210 over insulator block 266.

Second module 154 contains both third write gap 168 and read element 162. Third write gap 168 and read element 162 are constructed as a "merged pole" or "piggyback" structure. This structure allows for the top shield of read element 162 to be used as bottom pole 214 of third write gap 162. The material in insulator layer 218 between read element 168 and bottom pole 214 may be adjusted for thickness to prevent simultaneous servo read and high frequency write due to gap parallelism error between first module 152 and second module 154. Servo read element 168 may have the same dimensions as servo read element 46 in tape head 22. Servo read element 168 may be a thin film shielded SAL sensor with permanent magnet and periodic structure stabilization. Servo read element 168 is positioned to be centered over low frequency fields 62, 64 written by first write gap 158 and second write gap 160, respectively. The width of high frequency field 66 is determined by top pole 216 and is centered on low frequency fields 62, 64. Write signals are provided to third gap 162 and read signals received from servo read element 168 by flex attach cable 268.

Figure 16:
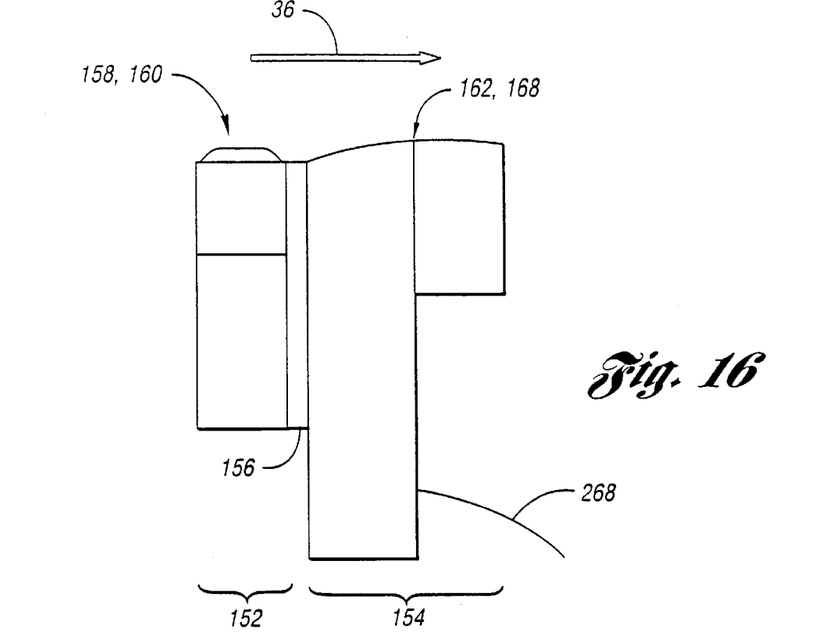
FIG. 16 is a side view drawing illustrating a servo track write head according to an embodiment of the present invention.
Figure 17:
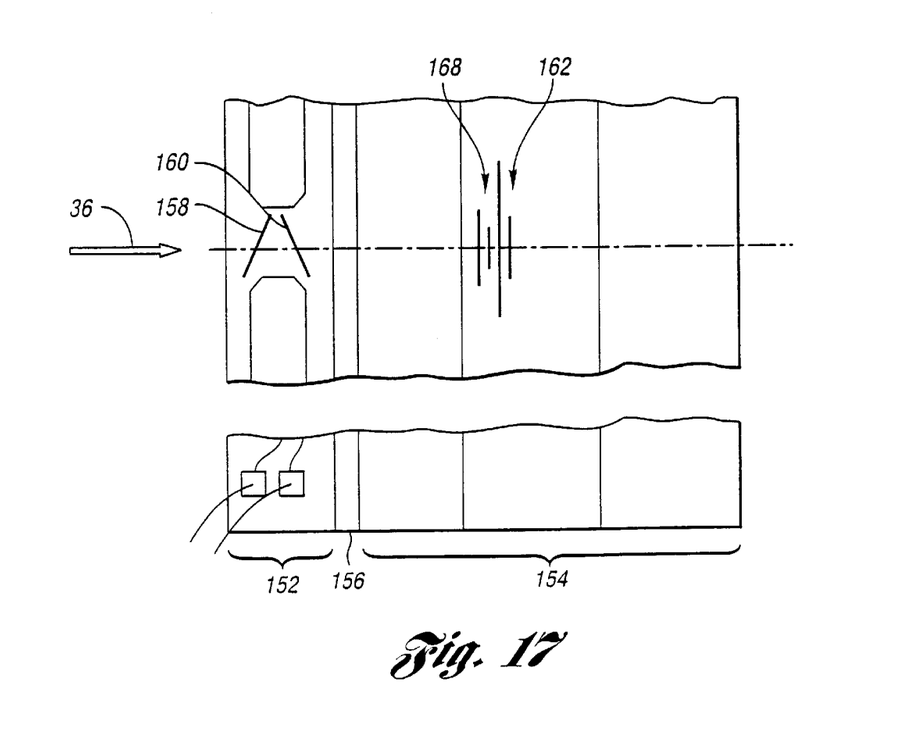
FIG. 17 is a top view drawing of the servo track write head of FIG. 16.

Referring now to FIG. 16, a side view drawing, and FIG. 17, a top view drawing, a servo track write head according to an embodiment of the present invention is shown. FIGS. 16 and 17 are conceptualized drawings and are not drawn to scale. In the embodiment shown, first module 152 defines first write gap 158 and second write gap 160 in a thin film structure as described with regards to FIGS. 12 and 13 above. Second module 154 defines third write gap 162 and write element 168 using a merged pole structure as described with regards to FIGS. 14 and 15 above. First module 152 and second module 154 are separated by magnetic shield 156.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A servo pattern recorded longitudinally along a length of a magnetic tape, the servo pattern comprising a plurality of servo frames, each servo frame comprising:
    a first field of recorded low frequency transitions, the first field transitions recorded on the tape such that a peak of each first field transition varies in longitudinal position across a width of the servo frame;
    a second field of recorded low frequency transitions, the second field transitions recorded on the tape such that no peak of any second field transition is parallel with the peak of any first field transition at any transverse location across the servo frame; and
    at least one high frequency field recorded on the tape defining a timing pattern.

2. A servo pattern as in claim 1 wherein at least a subset of the plurality of servo frames further comprises at least one high frequency field defining servo data.

3. A servo pattern as in claim 2 wherein the servo data encodes longitudinal position along the length of the tape.

4. A servo pattern as in claim 2 wherein the servo data encodes transverse position across the width of the tape.

5. A servo pattern as in claim 2 wherein the at least one high frequency field defining a timing pattern is two high frequency fields defining a timing pattern, one of the high frequency fields defining a timing pattern on either side of the high frequency field defining servo data.

6. A servo pattern as in claim 1 wherein each servo frame is symmetric with regards to longitudinal movement along the tape.

7. A servo pattern as in claim 1 wherein each servo frame in at least a subset of the plurality of servo frames provides the same information when read in one tape direction as information provided when read in an opposite tape direction.

8. A magnetic tape having a plurality of longitudinal data tracks for storing data, the tape comprising a plurality of servo tracks written along a length of the tape, each servo track comprising:
    a plurality of servo frames, each servo frame having a first field of recorded low frequency transitions and a second field of recorded low frequency transitions, the first field transitions recorded on the tape such that a peak of each first field transition varies in longitudinal position across a width of the servo frame, the second field transitions recorded on the tape such that no peak of any second field transition is parallel with a corresponding peak of any first field transition; and
    a high frequency servo data field recorded in at least a subset of the plurality of servo frames, the high frequency servo data field indicating transverse position across the width of the tape.

9. A magnetic tape as in claim 8 wherein at least a second subset of the plurality of servo frames further comprises at least one high frequency timing field defining a timing pattern.

10. A magnetic tape as in claim 9 wherein the at least one high frequency field defining a timing pattern is two high frequency fields in each frame with a high frequency servo data field, one high frequency field defining a timing pattern on either side of the high frequency servo data field.

11. A magnetic tape as in claim 9 wherein the timing field provides a reference for generating a clock signal that varies with a tape speed.

12. A magnetic tape as in claim 9 wherein at least a second subset of the plurality of servo frames further comprises a high frequency longitudinal position field indicating position along the length of the tape.

13. A magnetic tape as in claim 12 wherein each servo frame is symmetric with regards to longitudinal movement along the tape.

14. A magnetic tape as in claim 8 wherein each servo frame in at least a subset of the plurality of servo frames provides the same information when read in one tape direction as information provided when read in an opposite tape direction.

15. A method of positioning a tape access head across a width of a tape, the method comprising:
    sensing transitions in a first low frequency field recorded on at least one of a plurality of servo tracks, each of the plurality of servo tracks recorded along a length of the tape;
    sensing transitions in a second low frequency field recorded on the at least one of the servo tracks, the second transitions not parallel to the first transitions;
    determining fine positioning across the tape width based on a time difference between sensing transitions in the first low frequency field and sensing transitions in the second low frequency field;

sensing a high frequency field recorded on at least one of the servo tracks; and determining gross positioning across the tape width based on the sensed high frequency field.

16. A method of positioning a tape access head across the width of a tape as in claim 15 wherein sensing transitions in the first low frequency field, sensing transitions in the second low frequency field and sensing the high frequency field result in the same information if the tape travels across the tape access head in a first longitudinal direction or in a second longitudinal direction opposite of the first longitudinal direction.

17. A method of positioning a tape access head across the width of a tape as in claim 15 further comprising:

sensing at least one additional high frequency field recorded on at least one of the servo tracks; and extracting timing information from the at least one additional sensed high frequency field.

18. A method of positioning a tape access head across the width of a tape as in claim 15 further comprising:

sensing at least one additional high frequency field recorded on at least one of the servo tracks; and extracting longitudinal tape position information from the at least one additional sensed high frequency field.

19. A method of determining a position of a tape access head across a width of a tape, the method comprising:

sensing transitions in a first low frequency field recorded on at least one of a plurality of servo tracks, each of the plurality of servo tracks recorded along a length of the tape;

sensing transitions in a second low frequency field recorded on the at least one of the plurality of servo tracks, the transitions in the second low frequency field oriented in a different direction than the transitions in the first low frequency field; and sensing a high frequency timing field recorded on at least one of the servo tracks.

20. A method of determining position of a tape access head across the width of a tape as in claim 19 wherein sensing transitions in the first low frequency field, sensing transitions in the second low frequency field and sensing the high frequency field result in the same information if the tape travels across the tape access head in a first longitudinal direction or in a second longitudinal direction opposite of the first longitudinal direction.

21. A method of determining position of a tape access head across the width of a tape as in claim 19 further comprising:

determining a tape travel parameter based on the high frequency timing field; and determining positioning across the tape width based on the tape travel parameter and on a time difference between sensing transitions in the first low frequency field and sensing transitions in the second low frequency field.

22. A method of determining position of a tape access head across the width of a tape as in claim 21 wherein the tape travel parameter comprises tape speed.

23. A method of determining position of a tape access head across the width of a tape as in claim 19 further comprising:

sensing at least one high frequency transverse position field; and determining transverse position of the tape access head across the width of the tape based also on the sensed at least one high frequency transverse position field.

24. A method of determining position of a tape access head across the width of a tape as in claim 19 further comprising:

sensing at least one high frequency longitudinal position field; and determining longitudinal position of the tape access head along the length of the tape based also on the sensed at least one high frequency longitudinal position field.

25. A tape deck for accessing a tape comprising:

a tape access head having a plurality of servo read elements, each servo read element operative to read one of a plurality of servo tracks written along a length of the tape;

a servo mechanism for positioning the tape access head across a width of the tape;

servo signal conditioning electronics in communication with the servo read elements;

position determination logic in communication with the conditioning electronics and the servo mechanism, the position determination logic operative to determine the transverse position of at least one servo read element across a width of the servo track read by the at least one servo read element based on two sets of low frequency transitions recorded on the read servo track, one set of low frequency transitions recorded non-parallel with the other set of low frequency transitions; and timing extraction logic in communication with the conditioning electronics, the timing extraction logic operative to extract a clock signal from high frequency transitions recorded on the read servo track as the tape moves past the tape head.

* * * * *